United States Patent
Parizhsky et al.

(10) Patent No.: US 7,463,669 B2
(45) Date of Patent: *Dec. 9, 2008

(54) METHOD OF TONE ALLOCATION FOR TONE HOPPING SEQUENCES

(75) Inventors: Vladimir Parizhsky, New York, NY (US); Junyi Li, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/683,399

(22) Filed: Mar. 7, 2007

(65) Prior Publication Data

US 2007/0165694 A1      Jul. 19, 2007

Related U.S. Application Data

(63) Continuation of application No. 10/174,144, filed on Jun. 18, 2002, now Pat. No. 7,212,564.

(60) Provisional application No. 60/299,834, filed on Jun. 21, 2001.

(51) Int. Cl.
 *H04L 27/30* (2006.01)
(52) U.S. Cl. .................. 375/132; 375/138; 370/436; 370/437; 370/468; 455/452.1
(58) Field of Classification Search ................ 375/130, 375/132, 133, 138, 140, 141, 144; 370/203, 370/208, 209, 210, 431, 436, 437, 464, 465, 370/468; 455/403, 422.1, 450, 452.1
See application file for complete search history.

(56) References Cited

U.S. PATENT DOCUMENTS

5,263,047 A    11/1993   Kotzin et al.

(Continued)

FOREIGN PATENT DOCUMENTS

CA         2298360         11/2000

(Continued)

OTHER PUBLICATIONS

Fazel, K. et al.: "A flexible and High Performance Cellular Mobile Communications System Based on Orthogonal MultiCarrier SSMA" Wireless Personal Communications, Kluwer Academic Publishers, NL, Vo. 2, No. 1/2, 1995, pp. 121-144.

(Continued)

*Primary Examiner*—Dac V Ha
(74) *Attorney, Agent, or Firm*—Kenneth K. Vu; James K. O'Hare; Thomas R. Rouse

(57) ABSTRACT

Methods and apparatus for allocating tones for communications purposes in adjoining cells of an OFDM system are described. Tones used in each cell are allocated to tone hopping sequences according to a tone to tone hopping sequence allocation function. Different cells use different tone to tone hopping sequence allocation functions to minimize the number of collisions between hopping sequences of neighboring cells. Tone hopping sequence to communications channel allocation functions are used to allocate tone hopping sequences to communications channels. Communications channels are used by wireless terminals, e.g., mobile nodes, to transmit data. Over time, a wireless terminal uses the tones included in the tone hopping sequences corresponding to communications channels it is authorized to use. Accordingly, tones are assigned to communications devices by a multi-function, e.g., two level, mapping operation.

25 Claims, 6 Drawing Sheets

U.S. PATENT DOCUMENTS

| | | | | |
|---|---|---|---|---|
| 5,410,538 | A | * | 4/1995 | Roche et al. ............... 370/479 |
| 5,859,841 | A | * | 1/1999 | Gitlits ..................... 370/335 |
| 5,867,478 | A | | 2/1999 | Baum et al. |
| 5,946,624 | A | * | 8/1999 | Petranovich et al. ........ 455/447 |
| 6,018,317 | A | | 1/2000 | Dogan et al. |
| 6,131,016 | A | | 10/2000 | Greenstein et al. |
| 6,246,713 | B1 | * | 6/2001 | Mattisson .................. 375/132 |
| 6,282,185 | B1 | | 8/2001 | Hakkinen et al. |
| 6,298,081 | B1 | | 10/2001 | Almgren et al. |
| 6,317,412 | B1 | | 11/2001 | Natali et al. |
| 6,473,418 | B1 | | 10/2002 | Laroia et al. |
| 6,507,568 | B2 | | 1/2003 | Kumar et al. |

FOREIGN PATENT DOCUMENTS

WO          97026742          7/1997

OTHER PUBLICATIONS

Gernandez-Getino Garcia et al: "Efficient Pilot Patterns for Channel Estimation in OFDM System Over HF Channels", IEEE VTS 50th Vehicular Tech. Conf. Gateway to the 21st, Century Comm. Village, Amsterdam, 9/19/99, vol. 2, Conf 50, pp. 693-697.

Han, D. S., et al: On the Synchronization of MC-CDMA System for Indoor Wireless Communications:, VTC 1999-Fall, IEEE VTS 50th, Vehicular Tech. Conf; Gateway to the 21st Century Comm. Village, Amsterdam, Sep. 19-22, 1999 vol. 2, Conf. 50 Sep. 1999 pp. 693-697.

Reimers, U. "Digital Video Broadcasting", IEEE Communications Magazine, IEEE Service Center, Piscataway, NJ, US vol. 36. No. 6, Jun. 1, 1998, pp. 104-110.

Timor Uzi: "Multitone Frequency-Hopped MFSK System for Mobile Radio", Dec. 1982, The Bell System Technical Journal, vol. 61, No. 10. pp. 3007-3017.

Tufvesson et al: "Pilot Assisted Channel Estimation for OFDM in Mobile Cellular Systems", 1997 IEEE 47th Vehicular Technology Conference, New York, vol. 3, Conf 4 May 4, 1997 pp. 1639-1643.

Wang C. C. et al: "Dynamic Channel Resource Allocation in Frequency Hopped Wireless Communication System", Information Theory, 1994, Proceedings, 1994 IEEE International Symposium on Trondheim, Norway 27, Jun. 1-Jul. 7, 1994, NY Jun. 29, 1994 p. 229.

International Search Report PCT/02/019273, International Search Authority, United States, Oct. 29, 2002.

* cited by examiner

METHOD OF TONE ALLOCATION FOR TONE HOPPING SEQUENCES

RELATED APPLICATIONS

The present application is a continuation application of U.S. Ser. No. 10/174,144, filed Jun. 18, 2002 now U.S. Pat. No. 7,212,564 titled "Method and Tone Allocation for Tone Hopping Sequences" which claims the benefit of U.S. Provisional patent application Ser. No. 60/299,834 filed Jun. 21, 2001 titled "Permutation Method For OFDM Tone Hopping" which is hereby expressly incorporated by reference.

FIELD OF THE INVENTION

The present invention relates to communications systems and, more particularly, to methods and apparatus for allocating tones, e.g., in a cellular communications network.

BACKGROUND

In a cellular wireless system, a service area is divided into a number of coverage zones generally referred to as cells. Wireless terminals in a cell communicate with the base station that serves the cell. Wireless terminals may include a wide range of mobile devices including, e.g., cell phones and other mobile transmitters such as personal data assistants with wireless modems.

A problem with known cellular communications systems is that transmission by wireless devices in one cell may collide with transmissions by wireless devices in a neighboring cell. For example, OFDM takes a given bandwidth and splits it into a number of evenly spaced tones that can be used to transmit data. When transmissions by devices in overlapping cells use the same tone or set of tones, multiple collisions may occur over a period of time due to the operation of devices in neighboring cells. This problem is particularly noticeable where transmissions are periodic or nearly periodic.

In periodic or nearly periodic situations, mutual interference caused by wireless terminals in adjacent cells may be highly correlated. This is because when a tone assigned to a wireless terminal A corresponding to a first base station is the same as a tone of another wireless terminal B corresponding to an adjacent base station, in the next transmission period, the tone of wireless terminal A will again be the same as wireless terminal B in the case where the tones are assigned using the same function and recur periodically. Correlated interference of this type can cause signals transmitted by the same two wireless terminals to repeatedly interfere with each other over a long period of time. If the two interfering wireless terminals are disadvantageously located, the base stations in the overlapping cells may not be able to detect the signals correctly from the two interfering wireless terminals for a long period of time.

In order to reduce the risk of correlated or prolonged interference it would be beneficial if it was possible to assign tones to devices in neighboring cells in a manner that would minimize the risk of correlated interference. Unfortunately, this goal is complicated by the difficulties associated with trying to synchronize transmission from neighboring base stations.

One reason different cells are not synchronized is because of cost considerations concerning hardware and/or software implementation. For example, GPS (Global Positioning System) may be needed in the base station of each cell if accurate synchronization between base stations is desired.

The difficulty of synchronizing OFDM signals is a function of the carrier frequency used and the tone spacing. OFDM can use a carrier frequency of, e.g., 1.9 GHz and the space between each tone be around, e.g., 10 KHz. In such system the spacing between tones is relatively small in comparison to the carrier frequency. As a result, even relatively small differences in the carrier frequencies used by neighboring base stations due to oscillator errors in neighboring base stations may result in differences in tones of neighboring base stations by being off by the spacing of a full tone or more. For example, a first base station trying to transmit tone 0 at 1.9 GHZ may actual transit it at 1.9 GHz+10 KHz causing tone 0 of the first base station to be transmitted at the frequency of tone 1 of a neighboring base station which properly transmits tone 0 at 1.9 GHz and tone 1 at 1.9 GHz+10 KHz. Given the difficulty in synchronizing base stations in neighboring cells, the transmitter of neighboring cells are frequently unsynchronized.

The unsynchronized nature of different cells complicates the problem of minimizing the interference of wireless terminals between cells so that repeated interference encountered by any individual device is minimized.

In view of the above discussion, it becomes apparent that there is a need for minimizing the potential for collisions between transmissions that occur in neighboring cells of a wireless communications system, particularly in the case of unsynchronized base stations. It is desirable that the probability that transmissions from any given device in neighboring cells will collide repeatedly be minimized to avoid extended periods where communication signals are blocked for any particular device.

SUMMARY OF INVENTION

Figure 1:
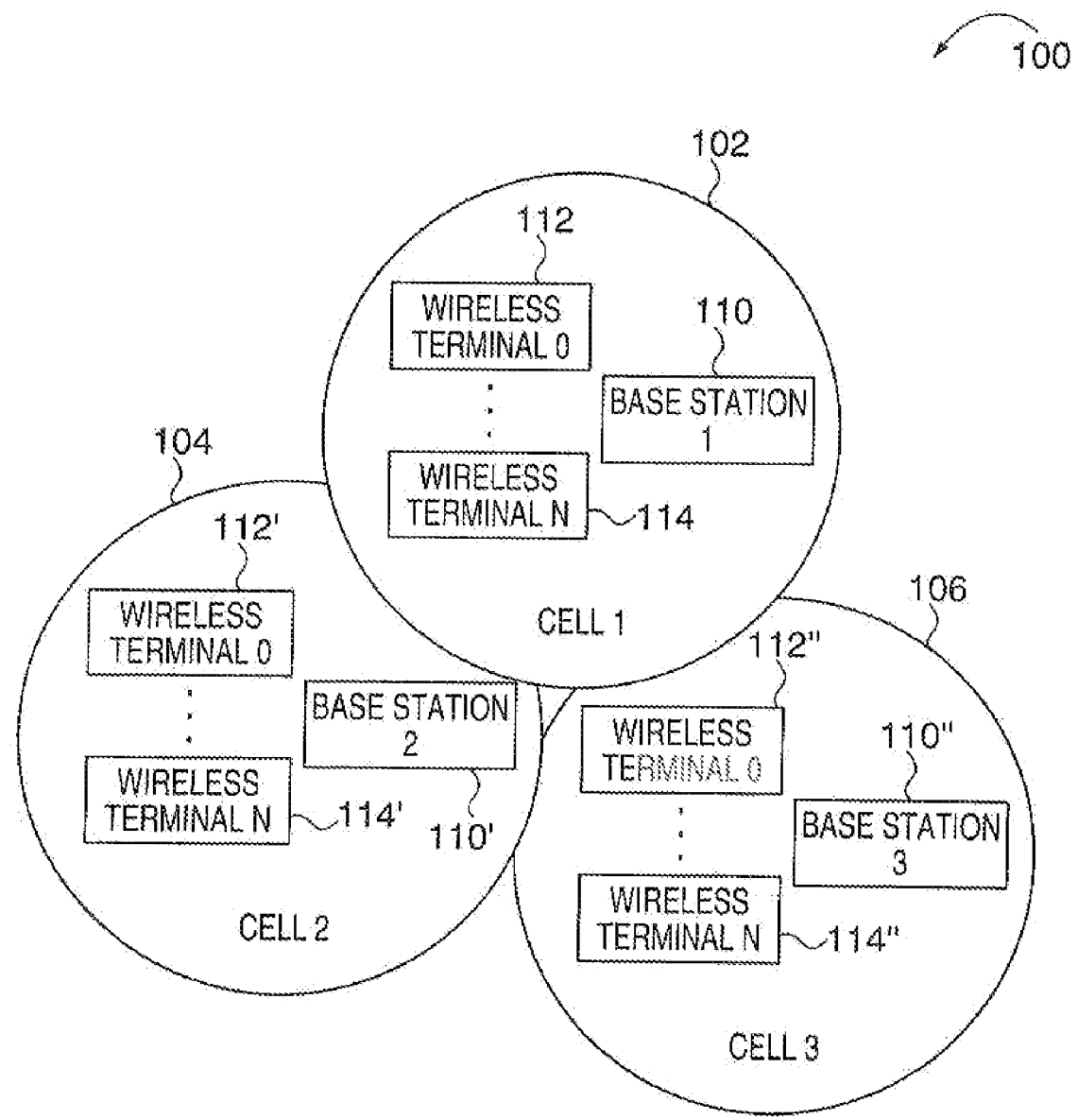
FIG. 1 illustrates a multi-cell communication system implemented in accordance with the invention.

The present invention is directed to communications methods and apparatus and, more particularly, to methods and apparatus for allocating and using tones for communications purposes in a multi-tone communications system. The system may be, for example, an orthogonal frequency division multiplexed (OFDM) system.

In accordance with the present invention, tones are allocated in cells of a communications system, e.g., by the base station included in each cell, to tone hopping sequences according to functions selected to minimize repeated collisions between hopping sequences of neighboring base stations, e.g., base stations with overlapping broadcast regions. Mobile nodes within a cell implement the same tone allocation function as the base station in the cell to determine which tones to use. Tones are allocated for a period of time known as a tone allocation period. Each tone corresponds to a different frequency.

The functions used to allocate tones to tone hopping functions in accordance with the present invention are selected to minimize repeated collisions between tone hopping sequences in a predictable manner even when the tones, e.g., frequencies, used for transmission in neighboring base stations are misaligned. Such frequency misalignment may be due to base station clock errors or other frequency discrepancies between base stations.

In accordance with one exemplary embodiment of the invention, a first base station allocates each tone, in a first set of P tones, once during each of a first plurality of P sequential tone allocation periods to a different one of a first plurality of P tone hopping sequences. The tone hopping sequences are used to determine tone allocation for use in communicating with another communications device. Allocation of tones by the first base station is performed according to a first function which allocates each of the P tones used by the first base station to a different one of the P tone hoping sequence during each of the plurality of P sequential tone allocation periods. Allocation of tones according to the first function repeats after P allocation periods.

A second base station with a broadcast area that overlaps the broadcast area of the first base station allocates tones in a second set of P tones, once during each of the first plurality of P sequential tone allocation periods according to a second function. The second function allocates, during each tone allocation period, each of the P tones in the second set of P tones, to a different one of a second plurality of P tone hopping sequences. The second function is different from said first function resulting in different tone to tone sequence allocations in the first and second cells.

The difference between the first and second functions may be as simple as the use of a different constant value by each of the first and second base stations when implementing the function used to allocate tones to tone hopping sequences. The constant value used to implement a base station's tone allocation function may be stored in the base stations's memory as well as the memory of mobile nodes within the cell which includes the base station.

The tone allocation function used to assign tones to tone hopping functions in one exemplary embodiment may be expressed as:

$$f_{(f0,t)} = \begin{cases} \frac{s}{(t+f_0) \text{mod} P} \text{mod} P, & (t+f_0) \text{mod} P \neq 0 \\ 0, & (t+f_0) \text{mod} P = 0 \end{cases}$$

where $f_{(f0,t)}$ is the index of a tone allocated to hopping sequence $f_0$ for use in a time period corresponding to integer value t, where s and P are constant integer values and where mod P is a function that limits the function's output value to a value in the finite field of 0 to P−1 and where mod P may be defined as follows. Suppose x is equal to n*P+m, where n, m are integers and 0<=m<P. Then x mod P=m. Furthermore, (y/z) mod=w, if and only if (y−z*w) mod P=0.

Using the above function with different constant values s in the neighboring base stations, it is possible to limit the number of collusions between hopping sequences of neighboring base stations in a manner that allows the tones of any one hopping sequence in the set of P hopping sequences used by a first base station to collide with any one hopping sequence in a second set of P hopping sequences used by a neighboring base station at most twice during any P sequential tone allocation periods, where P is a constant value indicting the number of tones allocated within a cell using the above function during a single tone allocation period.

When the transmitters of the first and second base stations are synchronized in terms of frequency, the frequencies of the tones in the first and second sets of P tones will be the same. When synchronized, any one hopping sequence in the set of P hopping sequences used by a first base station will collide with any one hopping sequence in a second set of P hopping sequences used by a neighboring base station at most once during any P sequential tone allocation periods.

The function used to allocate tones to a tone hopping sequence may be described as a tone to tone hopping sequence allocation function. The base stations and mobile nodes of a communications system implemented in accordance with the present invention use another function to determine which hopping sequences correspond to a communications channel, and thus which tones correspond to said communications channel, during any given tone allocation period. The function used to allocate tone hopping sequences to communications channels may be the same as the function used to allocate tones to tone hopping sequences.

Communications channels may be assigned to one or more mobile nodes for use in communication with a base station of the present invention. Accordingly, to maintain synchronization, both the base station and mobile nodes in a cell implement the tone to tone hopping sequence allocation function and the tone hopping sequence to communications channel allocation function of the present invention. Thus, multiple functions may be used as part of the process of determining the allocation of tones to devices, e.g., mobile nodes and/or base stations.

The functions of the present invention may be implemented using hardware, software of a combination of hardware and software. Tone allocation charts may be computed once and stored in the base station and/or mobile nodes so that re-computing of the allocation information need not be performed on a continuous basis. In such embodiments, allocation of tones and tone sequences is still performed according to the functions even though the functions are not performed in real time during the allocation process.

Numerous additional features, benefits and details of the methods and apparatus of the present invention are described in the detailed description which follows.

DETAILED DESCRIPTION OF INVENTION

FIG. 1 shows a communication system 100 implemented in accordance with the present invention including multiple cells 102, 104, 106. Each cell 102, 104, 106 includes a plurality of wireless terminals (112, 114), (112', 114'), (112", 114") and a base station 110, 110', 110", respectively. Each wireless terminal includes a transmitter as well as a receiver. The wireless terminals may be mobile communications devices such as cell phones, personal data assistants with wireless modems, etc. Each base station 110, 110', 110" performs tone hopping in accordance with the present invention. The wireless terminals use the hopping algorithm of the present invention along with information received from the base station to determine the tones that they can use to transmit data. Note that neighboring cells 102, 104, 106 overlap slightly thereby providing the potential for signal collisions between signals being transmitted by wireless devices in neighboring cells.

Figure 2:
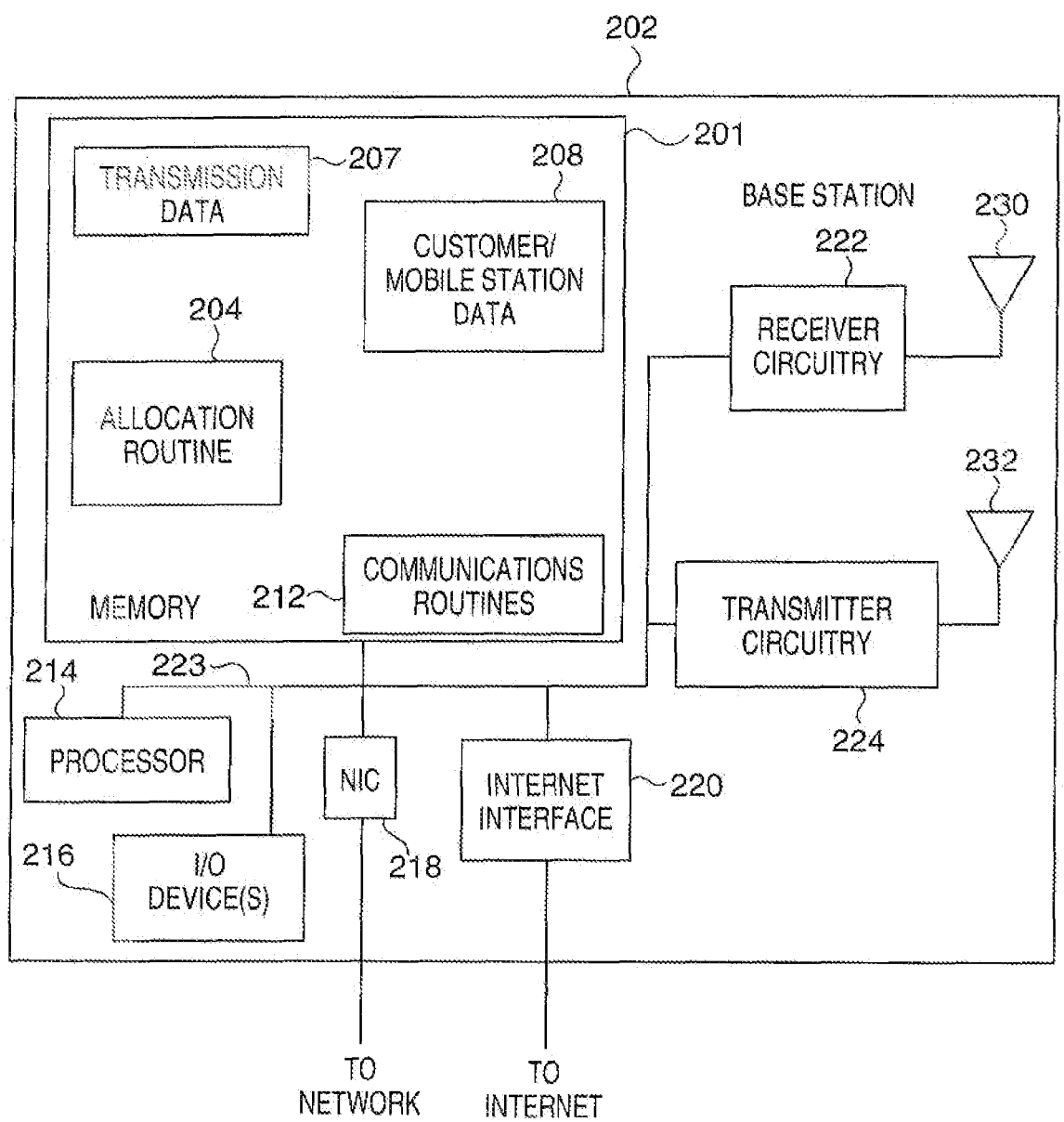
FIG. 2 illustrates a base station, suitable for use in the system of FIG. 1, which implements the scheduling method of the present invention.

FIG. 2 illustrates an exemplary base station 202. The base station 202 may be used as any one of the base stations, 110, 110', 110" of the system 100. The base station 202 includes a processor 214, memory 201, input/output (I/O) device 216, network interface card 218, internet interface 220, a receiver circuit 222 and a transmitter circuit 224 which are coupled together by a bus 223.

The processor 214, may be, e.g., a general purpose central processing unit (CPU). Processor 214 controls operation of the base station 202 under direction of one or more routines stored in memory 201. Memory 201 includes an allocation routine 204, communications routines 212, transmission data 207 and customer/mobile station data 208. Allocation routine 204 is used to allocate tones for the transmission of data and signals to wireless terminals served by the base station 202. The tone hopping function of the present invention, which will be discussed in detail below, is implemented by instructions included in the allocation routine 204. Communications routines 212 are responsible for controlling, when executed by the processor 214, the receipt, transmission of data via receiver circuit 222 and transmitter circuit 224. Antennas 230, 232 are coupled to receiver circuit 222 and transmitter circuit 224, respectively, and are used for receiving and broadcasting data and other signals, respectively.

Customer/mobile station data 208 includes information such as the maximum number of wireless terminals which may be served by the base station 202, information identifying wireless terminals which are being serviced by the base station 202 at a particular point in time, the number of wireless terminals registered with the base station 202, a carrier frequency for receiving transmitting data, the number of tones the carrier frequency is split into as well as other customer and/or wireless terminal related information. Transmission data 207 is data that is to be transmitted to wireless terminals, data received from wireless terminals and/or information relating to the transmission or receipt of data.

NIC 218 provides an interface through which the bases station 202 can connect to a network, e.g., a corporate LAN or WAN. Internet interface 220 servers as an interface to the Internet through which wireless terminals interacting with the base station 202 can send and receive data and perform other Internet access operations.

Figure 3:
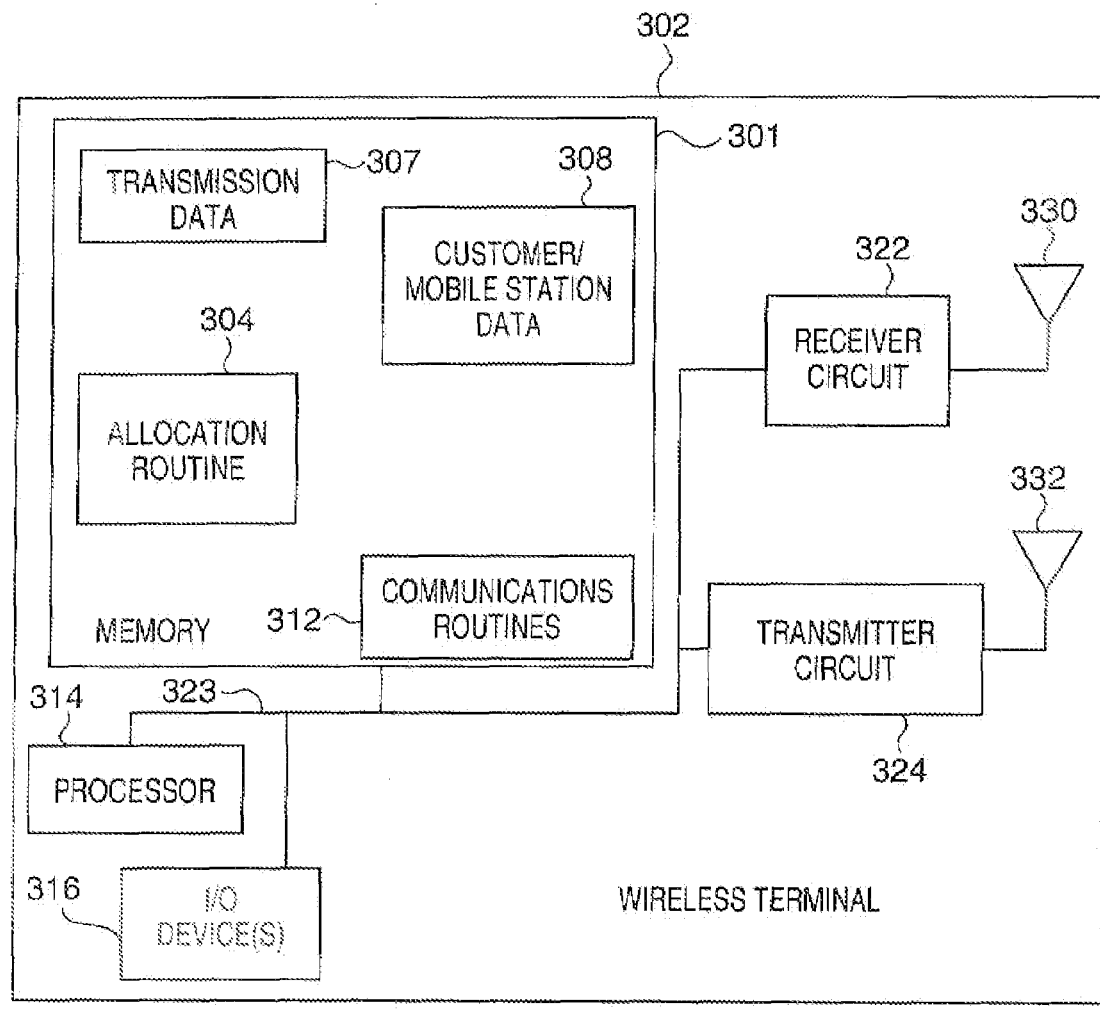
FIG. 3 illustrates a wireless terminal, suitable for use in the system of FIG. 1, which implements the tone hopping method of the present invention.

FIG. 3 illustrates an exemplary wireless terminal 302 which can be used as any one of the wireless terminals of the system 100 shown in FIG. 1. The wireless terminal 302 includes a processor 314, memory 301, input/output (I/O) device 316, a receiver circuit 322 and a transmitter circuit 224 which are coupled together by a bus 323. An antenna 330 used for receiving signals from a base station is coupled to receiver circuit 322. An antenna 332 used for transmitting signals, e.g., to base station 110 is coupled to transmitter circuit 324.

Wireless terminal allocation routine 304, when executed by processor 314, is used to determine when and on which tones the wireless terminal 302 is to transmit one or more signals to the base station with which the wireless terminal 302 is registered. The allocation routine 304 uses a hopping function, implemented in accordance with the present invention, along with information received from the base station, to determine the tones in which it should transmit.

Figure 4:
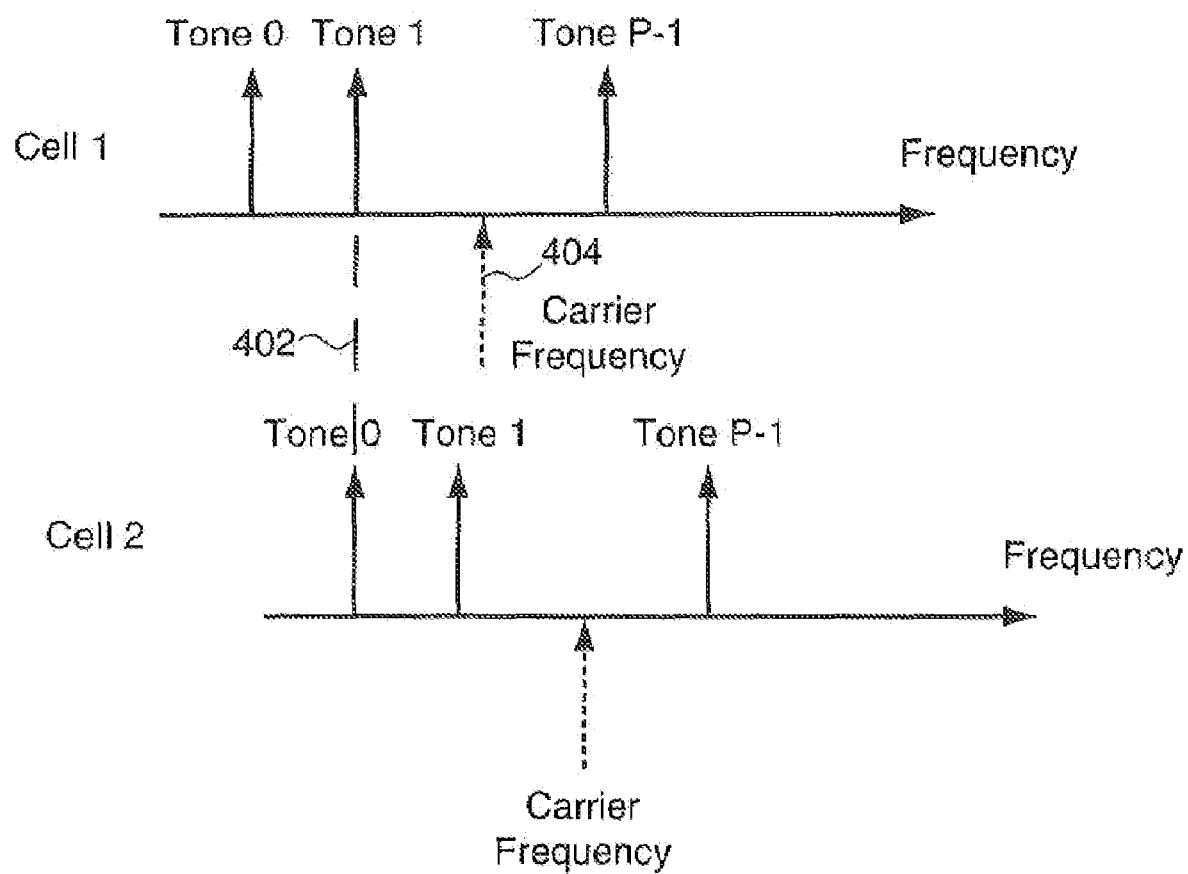
FIG. 4 illustrates an offset in tones on a carrier frequency for cells 1 and 2 of FIG. 1 in accordance with the invention.

FIG. 4 illustrates the OFDM spread spectrum air interface technology of the present invention, implemented for cell 1 102 and cell 2 104 of FIG. 1. The total amount of available bandwidth for a particular carrier frequency 404 is divided into a number, P, of equally spaced tones. These tones are indexed from 0 to P−1. The bandwidth is used simultaneously in both cells 102, 104. The tones, 0 through P−1, are allocated between the wireless terminals 112-114, and 112'-114' in each cell 102, 104, respectively, for use in transmitting and/or receiving user. Since the same bandwidth is used in both the cells 102, 104, the signals transmitted on the frequency tones may interfere with each other, e.g., in the overlapping coverage area of different cells.

When considering tone allocation schemes to reduce the amount of interference, it should be noted that, as discussed above, the carrier frequencies used in neighboring cells 1 102 and 2 104 may not be synchronized. For example, FIG. 4 shows the two carrier frequencies, from two separate cells 102, 104, that are exactly offset by one tone. In this case, tone k of cell 1 102 interferes with tone k−1 of cell 2 104, for k=1, . . . , P−1. More specifically, dashed line 402 illustrates tone 1 of cell 1 102 aligned with tone 0 of cell 2 104. In general, the carrier frequency offset may be of an integer number of tones plus a fraction of a tone. This offset is often due to the fact that the transmitter's oscillator may have a frequency error in the range of the distance between two tones. As described earlier, because of implementation costs and other considerations, it is desirable to avoid having to synchronize the transmitters in base stations of different cells.

In accordance with the invention, the tones of the OFDM spread spectrum system used by a particular terminal in the cell achieve frequency diversity and average interference between adjacent cells by hopping over the available frequency bandwidth. The available tones in each cell 102 that are allocated to a wireless terminal 112 change, i.e., hop, according to tone hopping sequences of the present invention. Moreover, in adjacent cells, the tones allocated to wireless terminals hop according to different tone hopping sequences so that the interference between tones of any given two tone hopping sequences used in different cells are averaged. This avoids the problem of prolonged periods of interference that might result if devices in neighboring cells used identical tone hopping sequences.

In accordance with one feature of the invention, the tone hopping sequences are based on mutually orthogonal Latin squares. The basic Latin square based hopping sequence, used to allocate one tone at each of a plurality of sequential tone allocation periods (t) is formulated as:

$$f_{(b,t)} = Z[(a \cdot t + b) \bmod P]$$

In the above equation, b is the index of a particular hopping sequence, t is the time index, $f_{(b,t)}$ is the index of the tone to be used at time t by a device assigned tone hopping sequence identified by tone hopping index b. Tone hopping index b may assume any one of P values, e.g., 0 to P−1. In the above equation α is the slope parameter that characterizes the hopping pattern, $f_{(b,t)}$, and P is a prime number representing the total number of tones. P will normally be fixed at or prior to implementation and is likely to be the same for neighboring base stations. Adjacent cells use different slopes, α, to achieve different hopping sequences. The value α used in different cells is set at implementation time or by a system administrator prior to tone allocation within a cell.

In the above equation Z is a permutation operator. For various design considerations, e.g., to define the above equation in the finite filed of order P, thereby limiting the output value of $f_{(b,t)}$ to be a value in the range of [0, . . . , P−1], i.e., the range of valid tone index values. An important feature of this function Z is that it is selected so that the interference between cells is optimally averaged so that each individual tone hopping sequence of one cell will collide with a tone hopping sequence of an adjacent cell exactly once in one period of the hopping sequence.

If two adjacent cells are carrier frequency synchronized, then the choice of Z does not affect the property of optimal interference averaging. However, as mentioned earlier, synchronizing cells may require costly hardware and/or software devices that may not be implemented. Therefore, assuming carrier frequencies used in the adjacent cells are not synchronized, the choice of the permutation operator, Z, will impact the cross correlation property of the hopping patterns between adjacent cells. In order to optimize the inter-cell interference averaging property in a system with unsynchronized carrier frequencies, the permutation operator, Z, should be carefully chosen.

In accordance with one embodiment of the invention, the permutation operator Z in the above equation is defined to be:

$$Z(x) = \begin{cases} \frac{1}{x} \bmod P, & x = 1, \ldots, P-1 \\ 0, & x = 0. \end{cases}$$

The available bandwidth is divided into P equally spaced tones that are indexed from 0 to P−1. Thus, each cell can accommodate P tone hopping sequences.

Applying the above definition of Z to the above equation used to define a tone hoping sequence, for slope α, at time t, the tone index of tone hopping sequence b, in a first exemplary embodiment, is given by $$f_{(b,t)} = \begin{cases} \frac{1}{(a \cdot t + b) \bmod P} \bmod P, & (a \cdot t + b) \bmod P \neq 0 \\ 0, & (a \cdot t + b) \bmod P = 0 \end{cases}$$

Alternatively, in accordance with a second embodiment of the present invention, the tone hopping sequence can be represented as $$f_{(f_0,t)} = \begin{cases} \frac{s}{(t + f_0) \bmod P} \bmod P, & (t + f_0) \bmod P \neq 0 \\ 0, & (t + f_0) \bmod P = 0 \end{cases}$$

In the above equation, s and $f_0$ are two characteristic parameters similar to parameters a and b. That is, parameter s is the same for all the hopping sequences in a given cell. Adjacent cells use different values of s to obtain different hopping sequences. Parameter $f_0$ is the index for the particular tone hopping sequence in the set of P hopping sequences.

The above two equations are equivalent provided that the parameters (a,b) and (s,$f_0$) are properly set.

Consider for example the case where a base station is assigned the value of s=1 and P=5. The above equations are used to determine the tones to be used at time, t, for a particular tone hopping sequence. Allocation of tones to devices may be made based on tone hopping sequences. For example, a device may be assigned to use the tones included in one or more tone hopping sequences as identified by the tone hopping indices.

Referring once again to the above example where S=1 and P=5, for tone hopping sequence 1, $f_0$=1, the allocated tone, $f_{(1,0)}$, for a first transmission period, t=0, would be determined as follows:

$$f_{(1,0)} = \frac{1}{(0 + 1) \bmod 5} \bmod 5 = 1$$

Meanwhile for a second tone hopping sequence, $f_0$=2, the allocated tone, f, for the first time period, t=0 would be:

$$f_{(2,0)} = \frac{1}{(0 + 2) \bmod 5} \bmod 5 = 3$$

Accordingly, the base station assigns tone hopping sequence 1 tone 1 for time slot 0 and the base station assigns tone hopping sequence 2 tone 3 for time slot 0.

For the next transmission period, t=1, tone hopping sequence 1 would be allocated a tone as follows:

$$f_{(1,1)} = \frac{1}{(1 + 1) \bmod 5} \bmod 5 = 3$$

Meanwhile tone hopping sequence 2 is allocated a tone as follows:

$$f_{(2,1)} = \frac{1}{(1 + 2) \bmod 5} \bmod 5 = 2$$

Accordingly, the base station assigns tone hopping sequence 1 tone 3 for time slot 1 and the base station assigns tone hopping sequence 2 tone 2 for time slot 1.

As discussed above, neighboring base stations are assigned different values for s resulting in different hopping function even in cases where P is the same for each system. For example, in the system 100, base station 110 may be assigned the value 1 for s, base station 110' may be assigned the value 2 for s while base station 110" may be assigned the value 3 for s.

Figure 5:
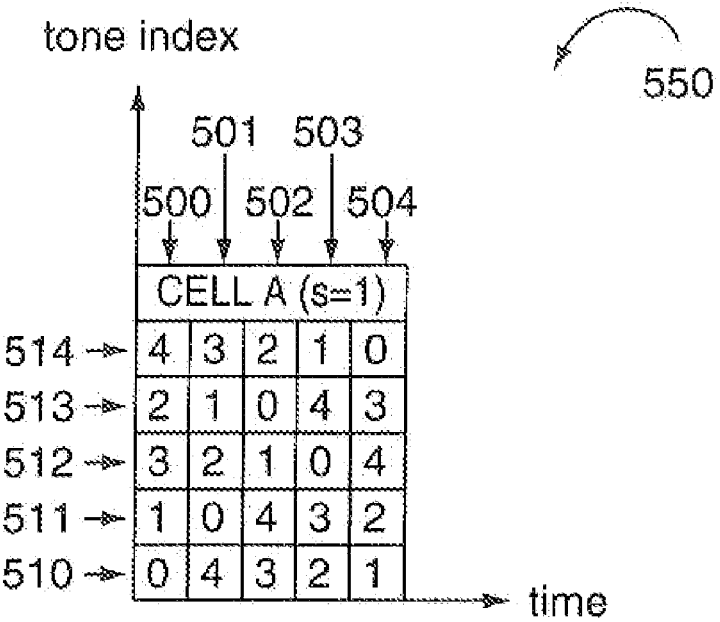
FIGS. 5 and 6 illustrate the exemplary allocation of tones, in a plurality of sequential transmission time slots, in accordance with various exemplary embodiments of the present invention.

FIG. 5, is a table 550 showing the allocation of tones for the tone hopping sequence of cell 1 102 when p=5 and s=1. During each time period each of the P tones, 0 to P−1, is allocated to one tone hopping sequence as identified through the use of a hopping sequence index value.

Each of rows 510 through 514 in FIG. 5 corresponds to one of the five equally spaced tones, identified by tone index 0, 1, 2, 3, 4, respectively. Columns 500 through 504 in FIG. 5 correspond to individual transmission time periods, e.g., allocation time periods, i.e., time periods 0, . . . , 4, respectively. Each element in a cell of the table 550 is a tone hopping sequence index. Thus, each row indicates the indices of the tone hopping sequences to which a particular tone, specified by the tone index to which the row corresponds, is allocated over time. Each column illustrates the indices of the tone hopping sequences that respectively occupy tones 0 to P−1 during the allocation time period to which the column corresponds.

By reading across a row 510, 511, 512, 513, 514, it is possible to determine the particular tone hopping sequence to which a particular tone is allocated at a given time in each of the successive time periods represented by the columns 500, 501, 502, 503, 504. Each entry in the chart 550 lists a tone hopping sequence allocated for the corresponding time periods 0, . . . , 4.

By reviewing FIG. 5 it can be seen that tone hopping sequence (THS) with tone hopping index value 0 (THS 0) comprises tones t0, t1, t3, t2, t4 in time periods 0, 1, 2, 3, 4, respectively. In addition, it can be seen that THS 1 comprises tones t1, t3, t2, t4 and t0 in tone allocation time periods 0, 1, 2, 3, 4. The tones allocated to the remaining hopping sequences can also be read from the chart of FIG. 5. The tone hopping sequences in each cell repeat over the time period P.

Figure 6:
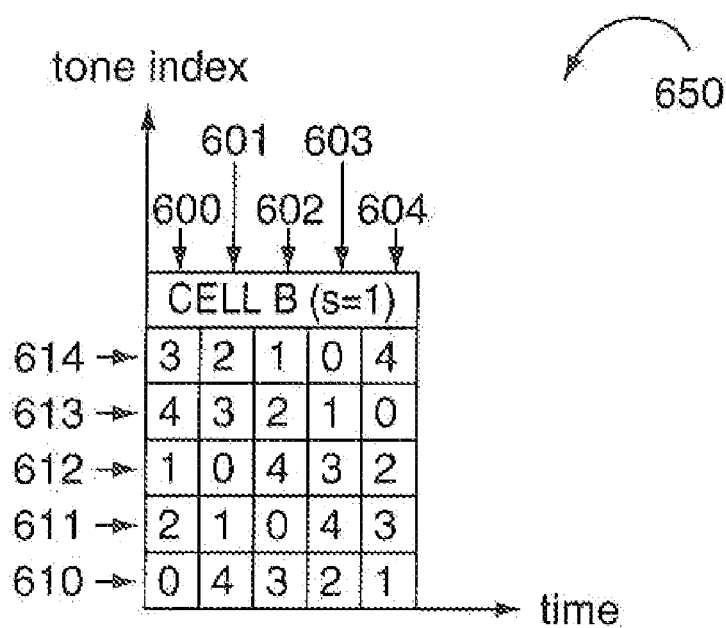

FIG. 6, is a table 650 showing the allocation of tones for the tone hopping sequence of cell 2 104 when P=5 and s=2. Each of rows 610 through 614 in FIG. 6 corresponds to a different one of the 5 equally spaced tones. As in the FIG. 5 example, columns 600 through 604 in FIG. 6 correspond to individual transmission time periods, 0, . . . , 4, respectively. Each element in the table 650 represents a tone hopping sequence index. Table 650 is read in the same manner as table 550. When FIGS. 5 and 6 are compared, it is shown that by using different values for each of the slope parameters, s, used in the neighboring cells the tone hopping sequences of the neighboring cells 102, 104, are allocated different tones thereby reducing the risk of correlated interference between tone hoping sequences in the two cells.

In accordance with the present invention wireless terminals are assigned one or more tone hopping sequences to sue for communicating with a base station. When a wireless terminal, e.g., terminal 112, enters a new cell 102, 104, or 106, the base station 110 in the cell communicates to the wireless terminal 112 information used to implement the hopping function(s) used in the cell to allocate tones and information identifying the tone hopping functions the cell is allocated for use. This may involve, for example, transmitting the value S to the wireless terminal to be used in implementing the tone allocation hopping function. Timing information may also be conveyed to the wireless terminal so that it can determine the current tone allocation period t. The value P may also be communicated to the wireless terminal but, in many embodiments, P is fixed and therefore need not be transmitted. The values t, P and s as well as hopping function index values may be explicitly communicated, e.g., transmitted to a wireless terminal, or implicitly communicated. In the case of implicit communication, one or more values, e.g., hopping function index values, s, P, and/or t are derived from information and/or signals transmitted to the wireless terminal.

While the base station implements the hopping function in accordance with the present invention to determine which tones are to be used by tone hopping sequences assigned to various wireless terminals, each wireless terminal also implements the hopping function to determine which tones are to be used for transmissions to the base station with which it is communicating at any given time.

The allocation scheme, of the present invention, has been designed so that for any tone offset due to unsynchronized carrier frequencies between the adjacent cells, the maximum number of tone collisions between two hopping sequences used in the adjacent cells during a full hopping sequence period, is equal to 2 even in the case where neighboring base station transmissions are unsynchronized. This is as small as one can get. Hence, the permutation operator can achieve optimal or near optimal inter-cell interference averaging in the presence of arbitrary tone offsets between adjacent cells.

In accordance with one feature of the present invention, the permutation operator is also used to determine which tones are used to form a logical channel at any point in time. A logical communications channel includes tones corresponding to one or more tone hopping sequences. The channel may be sued for a particular purpose. For example a traffic channel is used to carry traffic information while a control channel is used to carry control information. The number of tone hopping sequences of a channel is a function of the bit rate to be carried in that channel. For various embodiments of the invention, it is desirable that the indices of the hopping sequences used by a given channel are randomized. Such randomization provides greater frequency diversity.

In accordance with the invention, the permutation operator is used to achieve this objective. Specifically, logical channels are formed by a number of tone hopping sequences whose indices are obtained by applying the permutation operator to a set of contiguous integers. In particular, suppose the logical channel consists of N hopping sequences. Then the tone hopping formula of the j-th hopping sequence is given by $$f_j = \begin{cases} \dfrac{s}{\left(t+\left(\dfrac{1}{f_0+j}\right)\text{mod}P\right)\text{mod}P}\text{mod}P, & \left(t+\left(\dfrac{1}{f_0+j}\right)\text{mod}P\right)\text{mod}P \neq 0 \\ 0, & \left(t+\left(\dfrac{1}{f_0+j}\right)\text{mod}P\right)\text{mod}P = 0 \end{cases}$$

In the above equation, j=0, . . . , N−1 and $f_0$ is used to ensure that different logical channels have different indices of tone hopping sequences.

For example if 2 tone hopping sequences are desired to send some data, i.e., N=2, with s=1, and $f_0$=1, then the tones allocated for the logical channel are determined as follows:

$$f_0 = \dfrac{1}{\left(0+\left(\dfrac{1}{1+0}\right)\text{mod}5\right)\text{mod}5}\text{mod}5 = 1$$

and $$f_1 = \dfrac{1}{\left(0+\left(\dfrac{1}{1+1}\right)\text{mod}5\right)\text{mod}5}\text{mod}5 = 2$$

Accordingly the base station assigns tones 1 and 2 for the first time period, t=0, to the logical channel. In the next time period, t=1, the base station assigns tones 3 and 4 to the logical channel. This pattern corresponds to hopping sequences 1 and 3 of FIG. 5.

Since the number of tone hopping sequences of a channel is a function of the bit rate to be carried in that channel, the base station and the wireless terminal determine the value, N before transmissions are made. Thus, N is known to both the base station and wireless terminal, e.g., as the result of base station/wireless terminal interaction.

Figure 7:
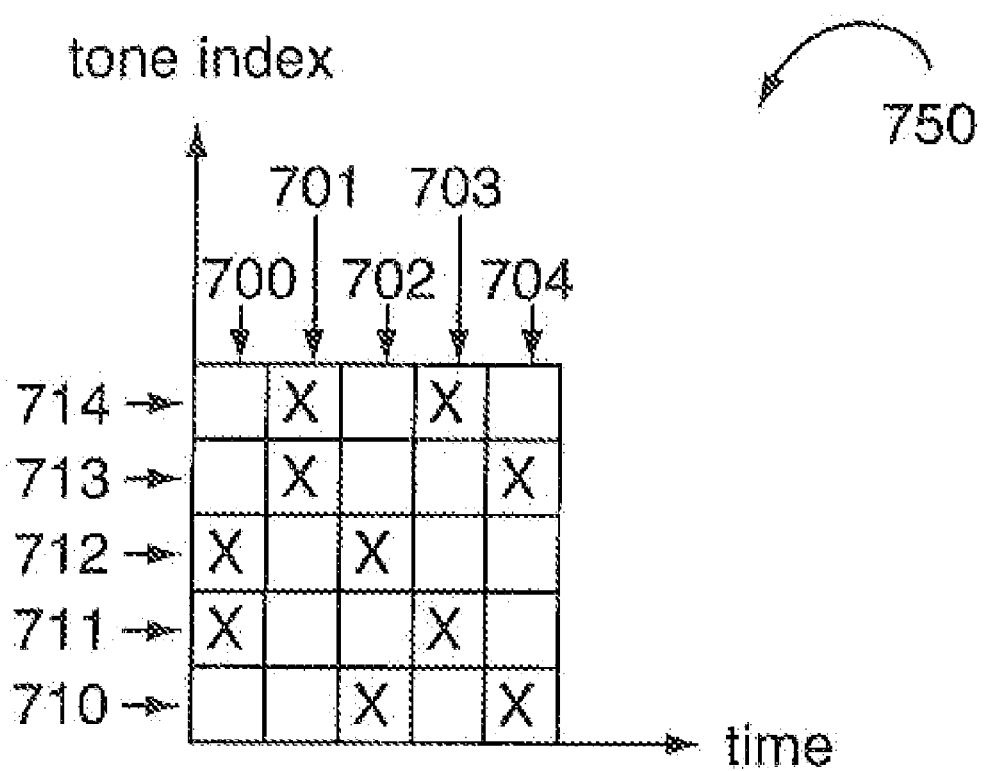
FIG. 7 illustrates the exemplary allocation of tones for a logical channel, in accordance with various exemplary embodiments of the present invention.

FIG. 7 illustrates a logical channel in cell 1 102 with s=1, N=1 and $f_0$=1. Each of rows 710 through 714 in FIG. 7 corresponds to a different one of the 5 equally spaced tones. Columns 700 through 714 in FIG. 7 correspond to individual transmission time periods. The elements checked in the table indicate that a corresponding tone is assigned to a logical channel at a given time. Referring back to FIG. 5, we can see that tone hopping sequences 1 and 3 are marked as the tone hoping sequences used by the logical channel.

The steps of the various methods of the invention discussed above may be implemented in a variety of ways, e.g., using software, hardware or a combination of software and hardware to perform each individual step or combination of steps discussed. Various embodiments of the present invention include means for performing the steps of the various methods. Each means may be implemented using software, hardware, e.g., circuits, or a combination of software and hardware. When software is used, the means for performing a step may also include circuitry such as a processor for executing the software. Accordingly, the present invention is directed to, among other things, computer executable instructions such as software for controlling a machine or circuit to perform one or more of the steps discussed above.

The invention claimed is:

1. A method of allocating tones in a multi-tone communication system, the system including a plurality of communications devices with overlapping transmission areas, the method comprising:
operating a first communications device to allocate each tone in a first set of P tones to one of a first set of P tone hopping sequences according to a first function, each of the first set of P tones being allocated according to said first function to a different one of the P tone hoping sequences during each of a first set of P sequential tone allocation periods; and
repeating said step of operating a first communications device to allocate each tone in said first set of P tones, such that tones in the first set of P tones are allocated to said first set of P hopping sequences in a pattern that repeats after said first plurality of P tone allocation periods, wherein at least one tone of the first set of P tones is concurrently allocated, according to a second function, to a second set of P tone hopping sequences used by a second communication device.

2. The method of claim 1, further comprising:
operating a second communications device, having a broadcast area that overlaps at least a portion of a broadcast area of said first communications device, to allocate each tone in a second set of P tones to one of a second set of P tone hopping sequences according to a second function, each of the second set of P tones being allocated according to said second function to a different one of the second P tone hoping sequences during each of said first set of P sequential tone allocation periods, said second function being different from said first function.

3. The method of claim 2, wherein said first and second functions allocate tones to the first and second sets of P hopping sequences in a manner that allows the tones of any one hopping sequence in the first set of hopping sequences to collide with any one hopping sequence in the second set of P hopping sequences at most twice during any P sequential tone allocation periods.

4. The method of claim 3, wherein when the frequency of said tones in said first set of P tones is synchronized to match the frequency of said tones in said second set of P tones, said tones of said any one hopping sequence in the first set of hopping sequences will collide with the tones of any one hopping sequence in the second set of P hopping sequences at most once during any P sequential tone allocation periods.

5. The method of claim 2, wherein the second function differs from the first function by the use of a different value for s in the first and second communications devices.

6. The method of claim 2, wherein said first communications device is a first base station which is part of a first communications cell, the method comprising:
operating a mobile node in said first communications cell to implement said first function to determine which tones to transmit on during at least some of said P sequential tone allocation periods.

7. The method of claim 6, wherein said first base station includes an OFDM receiver; and wherein said hopping sequences are OFDM tone hopping sequences.

8. The method of claim 1, wherein said first communications device is a first base station, the method further comprising:
operating the first base station to allocate at least some hopping sequences to a communications channel according to a third function such that the communications channel includes tones from different hopping functions during different tone allocation periods.

9. The method of claim 8, further comprising:
operating the first base station to assign communications channels, at least one of which is said communications channel, to a mobile node for use in communicating with said first base station; and
receiving information from said mobile node transmitted to said first base station using the tones of a hopping sequence corresponding to a communications channel assigned to said mobile node.

10. The method of claim 1, wherein the first function can be expressed as follows:

$$f_{(f_0,t)} = \begin{cases} \dfrac{s}{(t+f_0)\bmod P}\bmod P, & (t+f_0)\bmod P \neq 0 \\ 0, & (t+f_0)\bmod P = 0 \end{cases}$$

where $f_{(f_0,t)}$ is the index of a tone allocated to hopping sequence $f_0$ for use in a time period corresponding to integer value t, and where s and P are constant integer values.

11. The method of claim 1, further comprising:
operating the first communications device to assign a plurality of tone hopping sequences to a logical communications channel using a third hopping function.

12. The method of claim 11, wherein said step of operating the first communications device to assign a plurality of tone hopping sequences to a logical communications channel includes:
operating the first communications device to assign different tone hopping sequences to said logical communications channel during each of a plurality of sequential tone allocation time periods.

13. The method of claim 1, wherein concurrent allocation of the at least one tone means that it is part of the first set of P tone hopping sequences and second set of P tone hopping sequences at overlapping time periods.

14. The method of claim 1, wherein all tones of the first set of P tones are concurrently allocated to the first set of P hopping sequences and the second set of P tone hopping sequences.

15. A communications system comprising:
a first tone hopping communications device including:
i. means for allocating each tone, in a first set of P tones, once during each of a first plurality of P sequential tone allocation periods to a different one of a first plurality of P tone hopping sequences used to determine tone allocation for communications with another communications device according to a first function, each of the P tones being allocated according to said first function to a different one of the P tone hoping sequences during each of the plurality of P sequential tone allocation periods; and
ii. means for repeating said step operating a first communications device to allocate each tone in said first set of P tones, such that tones are allocated to hopping sequences in a pattern that repeats after said first plurality of P tone allocation periods, wherein at least one tone of the first set of P tones is concurrently allocated, according to a second function, to a second set of P tone hopping sequences used by a second communication device.

16. The communications system of claim 15, further comprising:
a second communications device having a broadcast area which overlaps at least a portion of the broadcast range of said first communications device, said second communications device including:
means for allocate each tone, in a second set of P tones, once during each of the first plurality of P sequential tone allocation periods to a different one of a second plurality of P tone hopping sequences according to a second function, each of the P tones being allocated according to said second function to a different one of the second plurality of P tone hoping sequences during each of the plurality of P sequential tone allocation periods, said second function being different from said first function.

17. The communications system of claim 16, wherein said first and second functions allocate tones to the first and second sets of P hopping sequences in a manner that allows the tones of any one hopping sequence in the first set of hopping sequences to collide with any one hopping sequence in the second set of P hopping sequences at most twice during any P sequential tone allocation periods.

18. The communications system of claim 15, wherein said first communications device is a first base station, the first base station further including:
means for allocating at least some hopping sequences to a communications channel according to a third function such that the communications channel comprises tones from different hopping functions during different tone allocation periods.

19. The communication system of claim 18, wherein said first base station further includes:
means for assigning communications channels, at least one of which is said communications channel, to a mobile node for use in communicating with said first base station.

20. The communications system of claim 19, wherein said first base station further includes:
a receiver for receiving information from said mobile node transmitted to said first base station using the tones of a hopping sequence corresponding to a communications channel assigned to said mobile node.

21. The communications system of claim 15, wherein the first function can be expressed as follows:

$$f_{(f_0,t)} = \begin{cases} \dfrac{s}{(t+f_0)\bmod P} \bmod P, & (t+f_0)\bmod P \neq 0 \\ 0, & (t+f_0)\bmod P = 0 \end{cases}$$

where $f_{(f_0,t)}$ is the index of a tone allocated to hopping sequence $f_0$ for use in a time period corresponding to integer value t, and where s and P are constant integer values stored by said first base station.

22. The communications system of claim 21,
wherein the second function differs from the first function by the use of a different value for s in the first and second communications devices; and
wherein the second base station includes memory including the values used to implement said second function.

23. A method of operating a communications device in a multi-tone communications system, comprising:
determining which tones correspond to a first set of tone hopping sequences using a first function which assigns a different tone to each of P different tone hopping sequences during each of P sequential tone allocation periods;
determining which tone hoping sequences correspond to a communications channel during a particular tone allocation period using a second function which assigns at least some of said tone hopping sequences to said communications channel; and
transmitting data using the tones of the tone hopping sequences determined to correspond to said communication channel,
wherein at least one tone of the of the tones used in the first set of tone hopping sequences is concurrently assigned, according to a second function, to a second set of tone hopping sequences.

24. A processor comprising:
a processing circuit configured to
allocate each tone, in a first set of P tones, once during each of a first plurality of P sequential tone allocation periods to a different one of a first plurality of P tone hopping sequences used to determine tone allocation according to a first function, each of the P tones being allocated according to said first function to a different one of the P tone hoping sequences during each of the plurality of P sequential tone allocation periods; and
repeat said step of allocating each tone in said first set of P tones, such that tones are allocated to hopping sequences in a pattern that repeats after said first plurality of P tone allocation periods,
wherein at least one tone of the first set of P tones is concurrently allocated, according to a second function, to a second set of P tone hopping sequences.

25. A computer-readable medium comprising instructions for allocating tones in a multi-tone communication system, which when executed by a processor causes the processor to:
allocating each tone, in a first set of P tones, once during each of a first plurality of P sequential tone allocation periods to a different one of a first plurality of P tone hopping sequences used to determine tone allocation according to a first function, each of the P tones being allocated according to said first function to a different one of the P tone hoping sequences during each of the plurality of P sequential tone allocation periods; and
repeating said step of allocating each tone in said first set of P tones, such that tones are allocated to hopping sequences in a pattern that repeats after said first plurality of P tone allocation periods,
wherein at least one tone of the first set of P tones is concurrently allocated, according to a second function, to a second set of P tone hopping sequences.

* * * * *